US010776592B2

(12) United States Patent
Krepel et al.

(10) Patent No.: US 10,776,592 B2
(45) Date of Patent: *Sep. 15, 2020

(54) DETERMINING COMPATIBILITY OF COMPONENTS FOR ASSEMBLING APPROVED PERSONAL PROTECTION CONFIGURATIONS

(71) Applicant: 3M INNOVATIVE PROPERTIES COMPANY, St. Paul, MN (US)

(72) Inventors: Kenneth J. Krepel, North St. Paul, MN (US); Brian S. McGinley, Woodbury, MN (US); Neal A. Rakow, Woodbury, MN (US); Paul A. Sevcik, White Bear Township, MN (US); Cristina U. Thomas, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/739,383

(22) Filed: Jan. 10, 2020

(65) Prior Publication Data

US 2020/0151405 A1 May 14, 2020

Related U.S. Application Data

(63) Continuation of application No. 16/396,819, filed on Apr. 29, 2019, now Pat. No. 10,579,841, which is a
(Continued)

(51) Int. Cl.
*G06K 7/10* (2006.01)
*G07C 11/00* (2006.01)

(52) U.S. Cl.
CPC .......... *G06K 7/10366* (2013.01); *G07C 11/00* (2013.01)

(58) Field of Classification Search
CPC ......... G06K 19/07749; G06K 19/0723; G06K 7/0008; G06K 7/10366; G06K 17/00;
(Continued)

(56) References Cited

U.S. PATENT DOCUMENTS 4,656,463 A 4/1987 Anders
5,023,597 A 6/1991 Salisbury
(Continued)

FOREIGN PATENT DOCUMENTS

DE 19816396 C1 11/1999
DE 10008048 9/2001
(Continued)

OTHER PUBLICATIONS

Durfee, Adam, et al., "White Paper on RFID, MEMS, and Their Application in the Field of Construction", University of Kentucky; Jan. 11, 2002, 36 pages.
(Continued)

*Primary Examiner* — James J Yang
(74) *Attorney, Agent, or Firm* — Steven A. Bern; Christopher D. Karlen

(57) ABSTRACT

This disclosure relates generally to methods and systems for determining whether at least a first component and a second component of a personal protection (PP) configuration are compatible so as to be assembled into an approved PP configuration, responsive to being compared against at least one predetermined criterion. Included is a smart tag for each of the first and second components. The first and second smart tags include respective first and second data. A data acquiring system is provided for acquiring the first and second data and a data processing system processes the acquired first and second data for determining if the first and second components are compatible to be assembled as an approved PP configuration.

20 Claims, 7 Drawing Sheets

Related U.S. Application Data continuation of application No. 15/888,708, filed on Feb. 5, 2018, now Pat. No. 10,275,621, which is a continuation of application No. 14/632,095, filed on Feb. 26, 2015, now Pat. No. 9,886,608, which is a continuation of application No. 11/848,476, filed on Aug. 31, 2007, now abandoned.

(58) Field of Classification Search
CPC .. H04B 5/0062; H01Q 1/2216; H01Q 1/2225; G06Q 10/087; G06Q 10/08
See application file for complete search history.

(56) References Cited

U.S. PATENT DOCUMENTS

| | | | |
|---|---|---|---|
| 5,164,707 A | 11/1992 | Rasmussen | |
| 5,552,772 A | 5/1996 | James | |
| 5,666,010 A | 9/1997 | Stratiotis | |
| 5,796,341 A | 8/1998 | Stratiotis | |
| 5,952,935 A | 9/1999 | Majia | |
| 5,971,282 A | 10/1999 | Rollender | |
| 6,100,806 A | 8/2000 | Gaukel | |
| 6,144,301 A | 11/2000 | Frieden | |
| 6,411,212 B1 | 6/2002 | Hecht | |
| 6,472,988 B1 | 10/2002 | Feld | |
| 6,741,174 B2 | 5/2004 | Rhoades | |
| 6,853,303 B2 | 2/2005 | Chen | |
| 6,995,665 B2 | 2/2006 | Appelt | |
| 6,995,673 B1 | 2/2006 | Osredkar | |
| 7,019,652 B2 | 3/2006 | Richardson | |
| 7,044,373 B1 | 5/2006 | Garber | |
| 7,069,100 B2 | 6/2006 | Monette | |
| 7,098,793 B2 | 8/2006 | Chung | |
| 7,113,094 B2 | 9/2006 | Garber | |
| 7,123,151 B2 | 10/2006 | Garber | |
| 7,158,030 B2 | 1/2007 | Chung | |
| 7,464,001 B1* | 12/2008 | Adams | G06Q 10/06 702/183 |
| 2001/0047283 A1 | 11/2001 | Melick | |
| 2002/0008623 A1 | 1/2002 | Garber | |
| 2002/0031997 A1 | 3/2002 | Lawler, Jr. | |
| 2003/0156009 A1 | 8/2003 | Boulot | |
| 2004/0004547 A1 | 1/2004 | Appelt | |
| 2004/0088780 A1 | 5/2004 | Bachar | |
| 2004/0100384 A1 | 5/2004 | Chen | |
| 2004/0131498 A1 | 7/2004 | Kuutti | |
| 2005/0114165 A1 | 5/2005 | Allegre | |
| 2005/0131578 A1 | 6/2005 | Weaver | |
| 2005/0148828 A1 | 7/2005 | Lindsay | |
| 2005/0149387 A1 | 7/2005 | O'Shea | |
| 2005/0251424 A1 | 11/2005 | Sanders | |
| 2005/0258238 A1 | 11/2005 | Chapman | |
| 2006/0006999 A1 | 1/2006 | Walczyk | |
| 2006/0055552 A1 | 3/2006 | Chung | |
| 2006/0064320 A1 | 3/2006 | Postrel | |
| 2006/0117610 A1 | 6/2006 | Silvestri | |
| 2006/0125623 A1 | 6/2006 | Appelt | |
| 2006/0268462 A1 | 11/2006 | Ohwe | |
| 2007/0001837 A1 | 1/2007 | Larson | |
| 2007/0010721 A1 | 1/2007 | Chen | |
| 2007/0013519 A1 | 1/2007 | Chung | |
| 2007/0199567 A1 | 8/2007 | Kanzer | |
| 2010/0295660 A1 | 11/2010 | Farioli | |
| 2011/0001602 A1 | 1/2011 | Farioli | |
| 2011/0115629 A1 | 5/2011 | Holler | |
| 2011/0227700 A1 | 9/2011 | Hamerly | |
| 2011/0234374 A1 | 9/2011 | Insley | |
| 2012/0326837 A1* | 12/2012 | Ajay | F16P 3/147 340/5.2 |
| 2015/0284231 A1* | 10/2015 | Grant | G07C 3/00 182/19 |

FOREIGN PATENT DOCUMENTS

| | | |
|---|---|---|
| EP | 1 516 640 A1 | 3/2005 |
| EP | 1 091 316 B1 | 3/2006 |
| FR | 2801998 | 6/2001 |
| FR | 2838061 B1 | 4/2002 |
| GB | 2422937 A | 8/2006 |
| JP | 06-299799 | 10/1994 |
| JP | 2005-078222 | 3/2005 |
| JP | 2006-072719 | 3/2006 |
| KR | 2006-0101405 | 9/2006 |
| KR | 2006-0123918 | 12/2006 |
| WO | WO 96/12524 | 5/1996 |
| WO | WO 2001/006401 | 1/2001 |
| WO | WO 2001/043827 | 6/2001 |
| WO | WO 2001/044082 | 6/2001 |
| WO | WO 2002/002191 | 1/2002 |
| WO | WO 2002/009957 | 2/2002 |
| WO | WO 2002/013150 | 2/2002 |
| WO | WO 2004008900 | 1/2004 |
| WO | WO 2004/074964 | 9/2004 |
| WO | WO 2008/091164 | 7/2008 |

OTHER PUBLICATIONS

Product Literature, *The Tracker*, "Harness Accessories", FrenchCreek Production; 1 p.

Product Literature, *Process Control and Machine Messaging*, WhereNet USA, 2003; 2 pp.

"RPE Management—Streamline your business with the latest technology", Initiative Business Systems Limited, Nutley, UK [retrieved from the internet May 17, 2007], URL <http://initbusy.com/rpecasestudy.html>; 3 pp.

"i-Safe™ Intelligent Safety System", Capital Safety, [retrieved from the internet Aug. 21, 2007], Url <http://www.capitalsafety.com/Default.aspx?tabid=220>; 10 pp.

Ward, Matt, et al., "RFID: Frequency, standards, adoption and innovation", *JISC Technology and Standards Watch* (May 2006), 36 pp.

Swedberg, Claire, "Safety Harnesses Get Smart", *RFID Journal* (2005), 2 pp.

* cited by examiner

FIG. 8

| TC- | PROTECTION¹ | ALTERNATE HEADGEAR BE-12 | BE-12L | BE-12B | BE-12LB | ALTERNATE BREATHING TUBES 520-01-80R01 | 520-03-32R01 | BLOWER 022-00-03 | ALTERNATE FILTER, CARTRIDGE, CANISTER 456-00-01 | 456-01-01 | 456-02-01 | 450-00-01 | 456-03-01 | 453-00-01 | 453-01-01 | 453-02-01 | 453-03-01 | 453-07-01 | ALTERNATE POWER SOURCE 520-01-15R01 | 520-01-17R01 | BP-15 | BP-17IS | ALTERNATE BELTS 520-02-23 | 520-02-90 | 524-01-19 | AIRFLOW INDICATOR 520-01-21 | ACCESSORIES 520-03-73 | 520-03-72 | 520-01-61 | BC-210 | CAUTIONS AND LIMITATIONS² |
|---|---|---|---|---|---|---|---|---|---|---|---|---|---|---|---|---|---|---|---|---|---|---|---|---|---|---|---|---|---|---|---|
| 23C-1181 | OV | × | × | × | × | × | × | × | × | | | | | | | | | | | × | × | × | × | × | × | × | × | × | × | × | ABCFIJLMNO |
| 23C-1187 | AM/MA | × | × | × | × | × | × | × | | × | | | | | | | | | | × | × | × | × | × | × | × | × | × | × | × | ABCFHIJLMNO |
| 23C-1185 | FM/CL/HC/SD | × | × | × | × | × | × | × | | | × | | | | | | | | | × | × | × | × | × | × | × | × | × | × | × | ABCFHIJLMNO |
| 21C-0575 | HE | × | × | × | × | × | × | × | | | | × | | | | | | | | × | × | × | × | × | × | × | × | × | × | × | ABCFHIJLMNO |
| 23C-1183 | OV/CL/HC/SD | × | × | × | × | × | × | × | | | | | × | | | | | | | × | × | × | × | × | × | × | × | × | × | × | ABCFHIJLMNO |
| 23C-1184 | OV/HE | × | × | × | × | × | × | × | | | | | | × | | | | | × | | × | | × | × | × | × | | | | × | ABCFHIJLMNOP |
| 23C-1186 | FM/CL/HC/SD/HE | × | × | × | × | × | × | × | | | | | | | × | | | | × | | × | | × | × | × | × | | | | × | ABCFHIJLMNOP |
| 23C-1188 | AM/MA/HE | × | × | × | × | × | × | × | | | | | | | | × | | | × | | × | | × | × | × | × | | | | × | ABCFHIJLMNOP |
| 23C-1182 | OV/CL/HC/SD/HE | × | × | × | × | × | × | × | | | | | | | | | × | | × | | × | | × | × | × | × | | | | × | ABCFHIJLMNOP |
| 23C-1212 | OV/HF/SD/HE | × | × | × | × | × | × | × | | | | | | | | | | × | × | | × | | × | × | × | × | | | | × | ABCFHIJLMNOP |

DETERMINING COMPATIBILITY OF COMPONENTS FOR ASSEMBLING APPROVED PERSONAL PROTECTION CONFIGURATIONS

BACKGROUND

This disclosure relates generally to methods and systems for determining compatibility of components usable together in a set of components. More particularly, it relates to methods and systems for determining whether at least a first component and at least a second component, which may be components of a PPE article are compatible so as to be assembled into an approved configuration in response to being compared against at least one predetermined criterion regarding approved PP configurations.

Maintaining the safety and health of workers is a major concern across many industries. Various rules and regulations have been developed to aid in addressing this concern, which provide sets of requirements to ensure proper administration of personnel health and safety procedures. To help in maintaining worker safety and health, some individuals may be required to don, wear, carry, or otherwise use a PPE article, if the individuals enter or remain in work environments that have hazardous or potentially hazardous conditions.

Known types of PPE articles include, without limitation, respiratory protection equipment (RPE), e.g., for normal condition use or emergency response; protective eyewear, such as visors, goggles, filters or shields; protective headwear, such as hard hats, hoods or helmets; hearing protection devices; protective shoes; protective gloves; other protective clothing, such as coveralls and aprons; protective articles, such as sensors, safety tools, detectors, global positioning devices, mining cap lamps and any other suitable gear.

There are many different kinds of RPE's utilized to prevent or reduce inhalations of contaminants, such as hazardous or toxic materials. Exemplary ones include without limitation: disposable filtering face piece respirators, half mask respirator with filters, full facemask respirators with filters, powered respirators with helmet or hood, and power assisted respirators with full facemask. RPE articles often comprise an assemblage of components that are to be assembled together into a configuration. For example, RPE articles include, without limitation, components, for example, air-purifying filters, cartridges, canisters or filters that remove specific air contaminants by passing ambient air through their air-purifying element. Other types of personal protection components usable with certain RPE's include, without limitation, suitable batteries, and specific kinds of breathing hoses.

Proper use of PPE's often comprises assembling compatible articles and components therefor into an approved PP configuration intended to be suitable for the risks involved in the workplace. This includes determining ahead of actual use, the risks arising from the workplace in order to assist in determining an appropriate configuration. For example, proper use of such RPE's is contingent upon their being assembled into an approved PP configuration with other components, such as breathing tubes, filtering components, and batteries. The approved PP configurations must satisfy predetermined criteria (e.g., rules, guidelines, regulations, certifications, etc.) regarding their compatibility relating to intended performance and use. The predetermined criteria may be promulgated from many different sources, including business and/or governmental sources. With more than 500,000 air contaminants encountered in certain work environments, there are numerous rules and regulations to follow and gather information about. It will be appreciated, therefore, that the process of determining whether the components and articles are compatible for forming an approved PP configuration can be quite demanding and at times quite onerous. Accordingly, companies using PPE articles have the responsibility of ensuring that workers use approved PP configurations. If not, potentially serious and/or costly consequences may rise.

The distribution of such articles and their components must be performed in compliance with the appropriate rules, guidelines, regulations, and certifications. Presently, government agencies or companies with large numbers of workers and with a variety of working environments generally have dedicated and highly knowledgeable personnel for the distribution of such articles and components to workers to insure that the appropriate components and articles are assembled together in a compatible manner to satisfy the noted rules and regulations. In addition, not only must the distribution be performed in accordance with rigorous standards, there is a likelihood that the rules, regulations, etc. may themselves change, thereby placing additional burdens on those charged with the responsibility of distributing them in an approved manner.

Moreover, predetermined criteria regarding proper and safe use of PP articles are often predicated upon assumed work environment conditions, such as the kinds and concentrations of particulate in the workplace, prevailing during actual use. However, the original selected configurations of components and articles based on an initial risk assessment may be in need of revision because of additional risks being present during actual use. For example, some half mask respirators with filters are unsuitable for certain contaminant vapors and may require additional components or additional PPE's (e.g., goggles) depending on a variety of factors. Therefore, updating selections based on updated risk assessments places additional administrative burdens on the administrators. Moreover, it would be of substantial value to determine at which location(s) the assumptions have changed, thereby allowing corrections to be made to the environment or the configurations.

Thus, needs exist for improved methods and systems that overcome or eliminate the drawbacks and shortcomings of known approaches for determining whether components forming PP articles are configured to be compatible, from the standpoint of satisfying at least a predetermined criterion relating to approved PP configurations.

SUMMARY

In one exemplary embodiment, the present disclosure provides a method for determining compatibility of first and second components for forming an approved PP configuration as determined by at least one predetermined criterion, the method comprising: a) providing a first component with a smart tag configured with first data; b) providing at least a second component with a smart tag configured with second data; c) acquiring the first and second data; and, d) determining if the first and second components are compatible to be assembled as an approved PP configuration by processing the first and second data in a data processing system against at least one predetermined criterion regarding compatible PP configurations.

In another exemplary embodiment, the present disclosure provides a system for determining compatibility at least a first component and a second component for forming an approved PP configuration as determined by at least one predetermined criterion, the system comprising: a) at least a first component having a smart tag configured with first data; b) at least a second component having a smart tag configured with second data; c) a data acquiring system for acquiring the first and second data; and, d) a data processing system for processing the acquired first and second data against a predetermined criterion for determining if the first and second components are compatible to be assembled as an approved PP configuration.

BRIEF DESCRIPTION OF THE DRAWINGS

FIG. 8 is a component compatibility chart for use in determining compatibility of components for approved PP configurations thereof.

DETAILED DESCRIPTION

The present disclosure substantially reduces drawbacks and shortcomings of known approaches in assembling components into approved PP configurations. More particularly, the present disclosure relates to methods and systems for determining whether at least a first component and a second component are compatible so as to be assembled into an approved configuration responsive to being compared against at least a predetermined criterion regarding compatible PP configurations.

Figure 1:
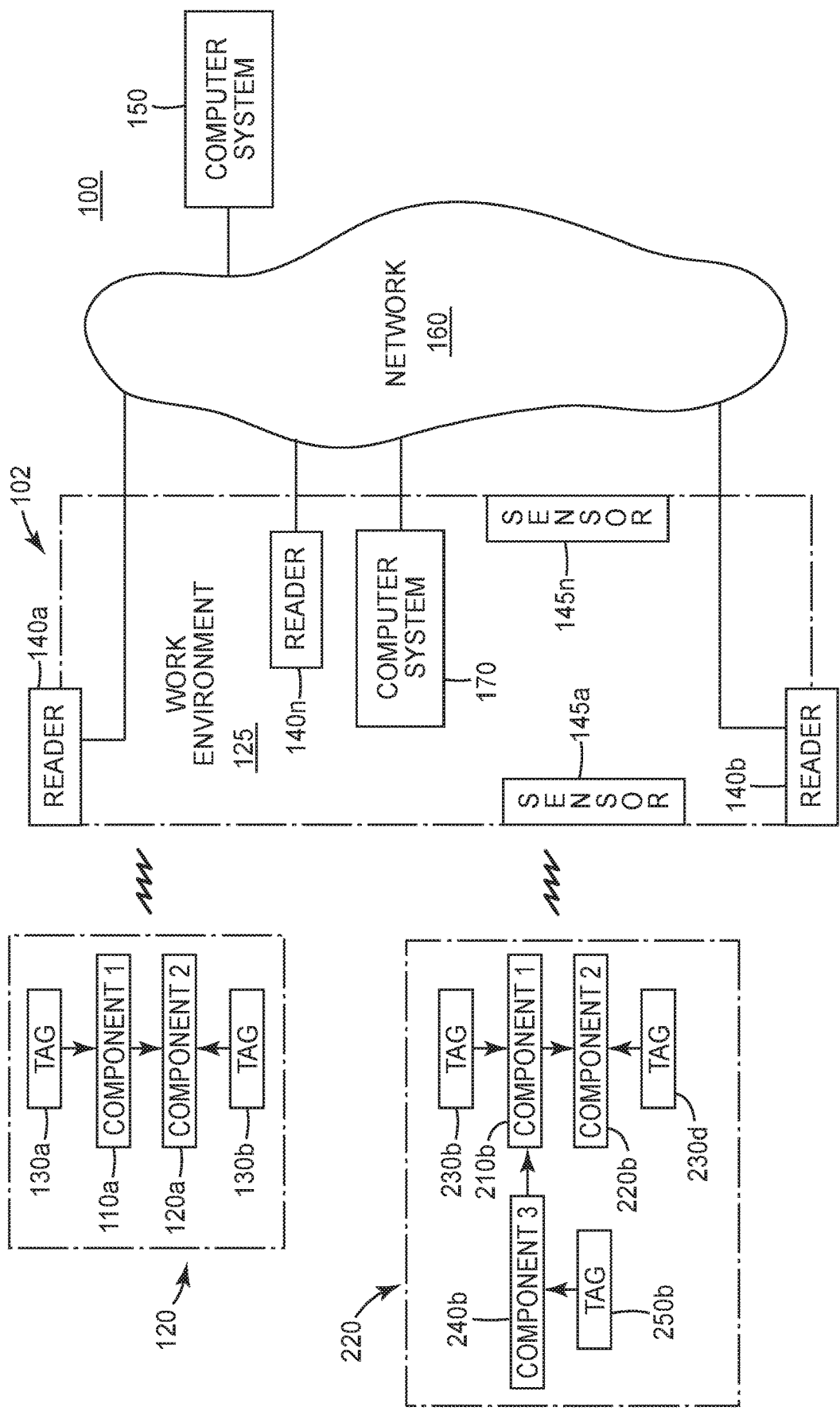
FIG. 1 is a block diagram of an exemplary PP component compatibility determining system capable of implementing the process of the present disclosure.

FIG. 1 illustrates a block diagram of a PP configuration compatibility determining system 100, according to one exemplary embodiment of the present disclosure. The PP configuration compatibility determining system 100 includes an information retrieval system 102 networked to a computer system 150. The PP configuration compatibility determining system 100 is utilized for implementing a process for determining compatibility of PP configurations, e.g., 120 and 220. The PP configuration 120 may comprise at least a first component of personal protection equipment (PPE) 120 *a* and at least a second component of personal protection equipment (PPE) 110*a* for use in combination to form an approved PP configuration based on at least one predetermined criterion. The PP configuration 220 may comprise at least a first component 220*b*, at least a second component 210*b*, and at least a third component 240*b* for use in combination to form an approved PP configuration based on at least one predetermined criterion. The exemplary approved PP configurations may be used in or may in some cases constitute PPE articles. One or more components suitable for use in exemplary embodiments of the present disclosure may also constitute or include a PPE article.

The components and PPE articles may be used in one or more working environments 125 (only one is illustrated). Exemplary working environments include, without limitation, paint shops, petrochemical refineries, mines, smelting facilities, pharmaceutical factories, or the like. "Predetermined criterion or criteria" as the terms are utilized in the present application refer to a set of rules, guidelines, regulations, recommendations, certifications, or the like that governs the compatibility of combinations of articles and components for configuring at least one PP configuration which satisfies at least one predetermined criterion. The rules, guidelines, regulations, recommendations, certifications, and the like may be promulgated from any source, including business and/or governmental sources. Examples of the foregoing include, without limitation, the OSHA respirator regulation that requires respirators be National Institute for Occupational Safety and Health (NIOSH) approved, and must be used in compliance with the conditions of (NIOSH) certification. Clearly, if not, that would be in violation of appropriate rules and regulations. Besides complying with NIOSH certifications, OSHA requires third-party approval from other entities, such as Underwriter Laboratories for electrical products in the workplace. Still other OSHA PPE rules and regulations require hard hats, safety glasses, and safety footwear meet specific ANSI certification standards. Also, companies using PPE articles have the responsibility for ensuring compliance with the appropriate rules, regulations, recommendations, and certifications. Facilities are sometimes allowed to determine their own predetermined criteria based on the particulars of their work environment, PPE articles and components, and the pertinent rules and regulations that govern the former. The present disclosure is not limited to OSHA rules and regulations, but any and all other appropriate rules and regulations.

In an illustrated exemplary embodiment, the PPE article may be an article of respiratory protective equipment (RPE). The PPE article may be assembled into a configuration or combination with one or more components used in conjunction with the PPE article. For example, an RPE article may be a 3M Air-Mate or High Efficiency (HE) Belt-Mounted Powered Air Purifying Respirator (PAPR) System that includes Air Filter Unit 520-03-63R01, battery pack 007-00-15R01, HE filter 451-02-01R01, waist belt nylon 021-41-01R01 and Airflo indicator 021-14-00R01. Other components used with this HEPA PAPR assembly are headgear as Head Cover BE-12 Tychem QC, breathing tube as BE-224, and battery charger such as single battery charger 520-0373. The present disclosure is not limited by any combination or configurations, but envisions all suitable combinations or configurations intended to satisfy predetermined equipment compatibility criteria. Known types of PPE articles include, without limitation, protective eyewear, such as visors, goggles, filters or shields, protective headwear, such as hard hats, hoods or helmets, hearing protection, protective shoes, protective gloves, other protective clothing, such as coveralls and aprons, protective articles, such as sensors, safety tools, detectors, global positioning devices, mining cap lamps and any other suitable gear. Known types of components include, without limitation, a nose piece, a valve cover, a strap assembly, a face piece, a hood, a helmet, a motor, a hose, a filter of a welding helmet, a visor, power supply, a lighting mechanism, such as a mining-cap lamp, etc.

In one exemplary embodiment, the compatibility determining system 100 includes one or more smart tags 130a, 130b, 230b, 230d, 250b; one or more data acquiring devices 140a-n (collectively, 140) that acquire data from the smart tags; and, one or more sensors 145a-n (collectively, 145) that, as will be described, sense for variables that are related to usage of the PPE article and component(s) being tracked. Given the number of different kinds of smart tags, data acquiring devices, and sensors that can be used, there exists a large number of combinations for the system 100 that can be constructed depending on the PPE articles and components and the appropriate predetermined criterion against which they will be evaluated. Accordingly, the exemplary system 100 is but one of many different and suitable types.

The present disclosure contemplates use of any suitable smart tag known in the art. All suitable types of components and PPE articles are envisioned to be tagged either directly or indirectly with a smart tag. In one exemplary embodiment, an appropriate smart tag is directly attached to the PPE article, such as an article of RPE, and/or its selected components, such as a filter cartridge and a battery.

Essentially, a smart tag is a data carrier that carries data accessible by suitable methods, including, but not limited to, electronic, optical, or other wireless technology. Data on a smart tag may, typically, at least, include tag identification information, such as identification numbers (e.g., serial number and model number). In addition, the smart tag may contain other information relating to the components and articles of PPE, such as the type of component and/or article used; historical information relating to the component and article, information about the user (who used it, where it was used, under what condition it was used, etc.) maintenance or other type of processing; information about who wrote information onto the smart tag; any requirements relating to the article and its associated component(s), and/or their use, whether any such requirements have been satisfied, such as any certifications obtained, and any other useful information, such as change-out history, or the working environment. Also, information regarding the user of the component and article of PPE may be on the smart tag; such as, medical information, information relating to fit-testing, training, job responsibilities, seniority or experience, access privileges or any other information.

Smart tags include passive and active types. Generally, passive tags do not include an internal power source and the data carried thereby may be encoded at manufacture. Data information may be acquired from a passive smart tag by, for example, radio frequency, microwave, infrared, or other wireless modes; or by optical readers or other appropriate electronic or optical technology. One type of passive smart tag is radio frequency identification (RFID) tag, wherein a transponder carries read-only data. Another type of passive smart tags may be rewritable. RFID technology is known and understood by those skilled in the art and, hence, only a brief description is included herein for facilitating understanding of the present disclosure. Passive RFID type smart tags are typically provided in the form of small labels or the like that include a coiled, etched or stamped antenna, a capacitor, and a substrate on which the components are mounted or embedded. For some metallic smart tags, the metallic portion itself may serve as the antenna. The RFID type smart tag may be embedded in or attached to the components and PPE articles by any suitable approach. For example, the smart tags may be joinable as by being adhered, fastened, sewn, friction fitted, mechanically clipped, welded (e.g., ultrasonically) or molded, etc. onto or into the components and PPE articles. Besides passive RFID smart tags, other passive smart tags may include, without limitation, optical kinds including barcode and optical character recognition systems; electromagnetic systems; and acoustomagnetic systems.

On the other hand, active smart tags tend to carry their own internal power source as well as data, and an appropriate antenna for allowing exchanging of their data. The internal power supply may include a micro-battery, a thin film battery, or the like. Active smart tags may be reprogrammable and include, besides an antenna, a microchip to receive and store additional information beyond the information contained in its fixed code. Active smart tags may exchange their data information with data acquiring and/or transmitting devices, such as including, without limitation, readers and/or writers, scanners, and/or data receivers, such as wireless receivers. The exchange may be initiated by the active smart tag itself once it finds a suitable or designated, reader, scanner, or receiver. The active smart tags may transmit their data responsive to triggering or interrogating signals, they may actively transmit their data independent of such signals. For instance, the active smart tags may continuously or periodically transmit data to appropriate readers and/or writers, scanners, or receivers. As noted, some active smart tags include the capability to receive and store additional information beyond that contained by its encoded data. Other kinds of active smart tags may be configured to be rewritable. For instance, an active RFID smart tag may be rewritable, as by an RFID reader.

Other kinds of active smart tags include a real time location system (RTLS) smart tag. An RTLS smart tag is an active tag having a transmitter and a receiver and it communicates with a network according to a particular protocol. RTLS systems can work to determine the position of the smart tag in a 2-dimensional or 3-dimensional space. For example, a RTLS smart tag generally uses one or both of the following wireless location-based methods for determining the position of a smart tag or the object the tag is attached to.

The first is a Time Difference of Arrival (TDOA) method. In one implementation of this method, the smart tag will broadcast a signal to multiple wireless receivers 140 at known locations. The time at which the signal is received by each receiver is measured, and a set of equations can be used to determine the position of the smart tag. Examples of this system are a global positioning system (GPS) or a system using low frequency radio transmitters that use the time interval between radio signals (LORAN). Another example is an active smart tag used in a WiFi system that determines how long a signal takes to a receiver. Companies that use this principle for RTLS systems are Aero Scout Inc., Redwood City, Calif.; Nano Tron Technologies, GmbH, Berlin, Germany; WhereNet, Santa Clara, Calif.; and, MultiSpectral Solutions, Inc., Germantown, Md.

A RTLS may also use a Received Signal Strength Indicator (RSSI) method. This latter method requires tags or fixed transceivers to measure the received power (signal strength) of the incoming signals. Then, using either known variations of signal strength vs. distance from transmitters, or by measuring the signal strengths at various locations and matching these measured strengths to the measured strengths, position can be determined. Companies that provide commercially available products using the RTLS system include Wavetrend, Fairfax Va., and PanGo Networks, Framingham, Mass.

One example of an active smart tag suitable for use in an RTLS system is an Ekahau™ smart tag, which communicates with wireless receivers in a wireless local area network (WLAN) through IEEE 802.11b and 802.11g standards. The Ekahau™ smart tag is commercially available from Ekahau, Inc., Reston Va. and may be used in the present exemplary embodiment. Other examples of suitable smart tags may be provided, and include those, such as described, in U.S. Pat. No. 6,853,303, which is incorporated herein.

As noted, the data from the smart tag may be acquired by data acquiring devices 140, such as readers 140, readers/writers 140, scanners 140, or receivers, such as wireless receivers 140, as well as other suitable devices. A reader or scanner may include an antenna for transmitting a trigger signal to a smart tag and receiving a return signal from the tag containing information. The data acquiring devices 140 may be placed in any one or more of the critical spots of the process including but not limited to the area where the component(s) 110*a*, 120*a*, 210*b*, and PPE articles 120 are assembled and/or handed out to the individual. In some exemplary embodiments, one or more data acquiring devices 140, such as readers or scanner 140 are hand-held. For example, a receiver 140 may be a wireless node of a wireless local area network (WLAN) that may provide an internet access point.

The readers 140 may be linked to a remote programmable electronic system or computer 150 through the network 160. The programmable electronic system 150 includes functionalities that enable tracking usage of the PPE articles against at least a predetermined criterion. The readers may be programmable electronic systems themselves.

Reference is made to FIG. 8 for illustrating one exemplary embodiment of compatibility criterion according to the present disclosure. Such a criterion may be represented in a component/configuration compatibility chart 800 for a configuration of respirator components. These components are commercially available for a configuration of components available from 3M Company, St. Paul, Minn. for its Breathe Easy™ 12 Systems. It will be appreciated that NIOSH provides approvals for individual components and configurations for each manufacturer that seeks its approval for components and configurations. It will be understood that in reading this chart, 'X' designates a NIOSH approval. Row 802 identifies a NIOSH approved PP configuration of components. In the exemplary embodiment, the approved PP configuration of components 802 includes respective ones of each different component type that forms the configuration. Individual ones of the different component types are listed in columns 804-818 (i.e., alternate headgear—804, alternate breathing tubes—806, blower—808, alternate filter cartridges/canisters—810, alternate power sources—812, alternate belts—814, airflow indicator—816 and alternate accessories—818). In regard to the latter component in the exemplary embodiment, an approved PP configuration does not include accessories. Each of the different component types includes alternate versions of different models. For example, there are four (4) different headgear models, each with its model number, listed in columns 804*a-d*. For example, there are ten (10) different filter cartridges/canister types, each with its model number, listed in columns 810*a-j*. If one component (e.g., 804) is not approved or is not included in a configuration, then any such configuration (e.g., 802) is not NIOSH approved. Stated somewhat differently, all components must be approved and all components of a configuration must be included for the latter to be considered an approved PP configuration.

In the exemplary embodiment, column 820 includes different NIOSH approval numbers (e.g., TC-23-1181). These NIOSH approval numbers are listed in rows 822*a-j*. Column 824 provides a listing of different protections provided by each component that corresponds to a particular NIOSH number. The acronyms, of the kinds of protection, listed in column 824 are defined in the list in Table 1, below. Column 826 provides a listing of cautions and limitations that are associated with each of the approval numbers. Table 2, below, provides a definition associated with each letter appearing in any of the rows.

TABLE 1

OV—organic vapor
AM—ammonia
CL—chlorine
FM—formaldehyde
HC—hydrogen chloride
HF—hydrogen fluoride
MA—methylamine
SD—sulfur dioxide
HE—high efficiency particulate air filter for powered air-purifying respirators

TABLE 2

A—Not for use in atmospheres containing less than 19.5 percent oxygen.
B—Not for use in atmospheres immediately dangerous to life or health.
C—Do not exceed maximum use concentrations established by regulatory standards.
F—Do not use powered air -purifying respirators if airflow is less than four cfm (115 lpm) for tight fitting facepieces or six cfm (170 lpm) for hoods and/or
H—Follow established cartridge and canister change schedules or observe ELSI to helmets. ensure that cartridge and canisters are replaced before breakthrough occurs.
I—Contains electrical parts that have not been evaluated as an ignition source in flammable or explosive atmospheres by MSHA/NIOSH.
J—Failure to properly use and maintain this product could result in injury or death.
L—Follow the manufacturer's User/s Instructions for changing cartridge, canister and/or filters.
M—All approved respirators shall be selected, fitted, used, and maintained in accordance with MSHA, OSHA and other applicable standards.
N—Never substitute, modify, add or omit parts. Use only exact replacement parts in the configuration specified by the manufacturer.
O—Refer to User's Instructions, and/or maintenance manuals for information on use and maintenance of these respirators.
P—NIOSH does not evaluate respirators as surgical masks.

Figure 5:
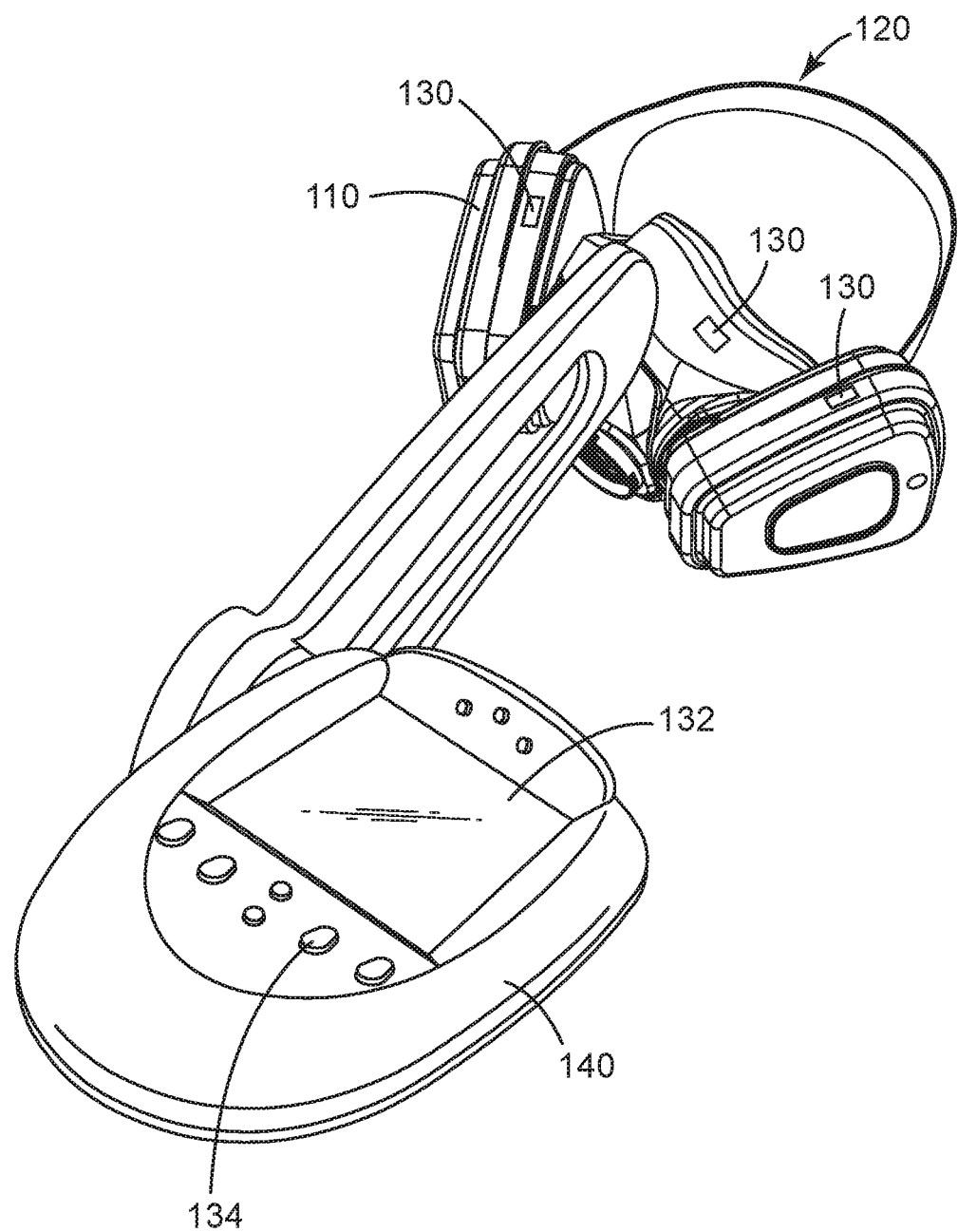
FIG. 5 is a schematic view of a smart tagged RPE including a portable reader.

As illustrated in FIGS. 1-4, the reader 140*a* may be stationed at the entrance of the work environment 125 and acquires relevant data of the wearer, component(s) 110, and the PPE article 120, such as at the start of the workday or shift and at the end of the work day or shift. The readers may be in several other locations, such as where the component(s) are coupled to the PPE article or in any one or more other suitable location. This information is sent to a database of the computer system 150 for the purposes which will be described. Alternatively or additionally, one or more readers 140 may be located within the actual work environment 125 so as to provide opportunities for wearers obtaining readings in the work environment 125. Alternatively or additionally, a portable reader 140 may be utilized (see FIG. 5), such as where the component(s) and PPE articles are issued prior to entering the work environment. A typical portable reader 140 may have a display 132 and keypad 134 for data input and are wirelessly connected to the network 160. The portable reader 140 may be used when the tagged component(s) and PPE articles are in the work environment 125 or at the end of a work shift. The portable reader may be part of a portable computer system. The present disclosure does not place limitations on the locations or timing of reading of the tagged component(s) and PPE articles.

Exemplary suitable sensors 145 of some exemplary embodiment may include, without limitation, measurement of the following analytes/parameters: electromagnetic radiation (such as thermal and visible), ionizing radiation, nuclear radiation, chemicals (such as liquids, solids, vapors, gases and mists/aerosols), biological analytes, particulates, noise, heat stress, motion, as well as others. The exemplary transducers may be of the electrical or optoelectronic type. The sensors 145 may be mobile or stationary in the work environment and connected, as for example, by wireless to the network. In the mobile mode, the sensors 145 may be disposed on the PPE or on the component. The sensed information data is generally related to the risks in the work environment which might affect the appropriateness of the configurations of the component(s) and PPE articles being tracked, as will be explained. The data, as noted, includes concentration levels, types of contaminants, presence or absence of contaminants, insufficient or no current to run a circuit of the component(s) and PPE article, inadequate filtering by the filtering cartridge, insufficient or no battery power, breakthrough of a chemical through a filter, or inoperable safety mechanisms. The data may be stored in the database for subsequent reporting and/or communication to a wearer and/or person responsible for issuing the configured components and PPE articles. The present disclosure is not limited by these examples since what is sensed encompasses all known factors that may relate to the compatibility of the combination or configuration of PPE articles and components.

Figure 3:
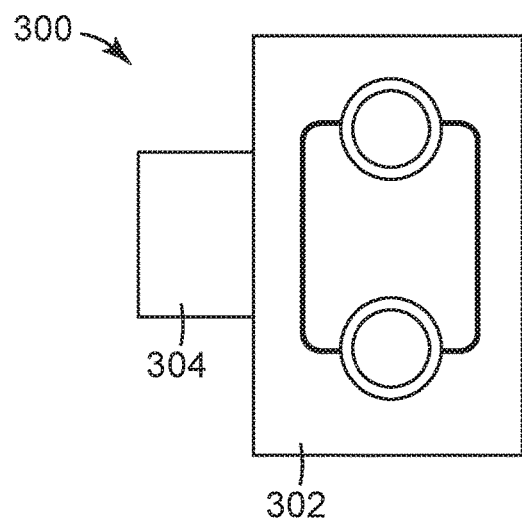
FIG. 3 is a schematic view of a smart tag coupled to a sensor.
Figure 4:
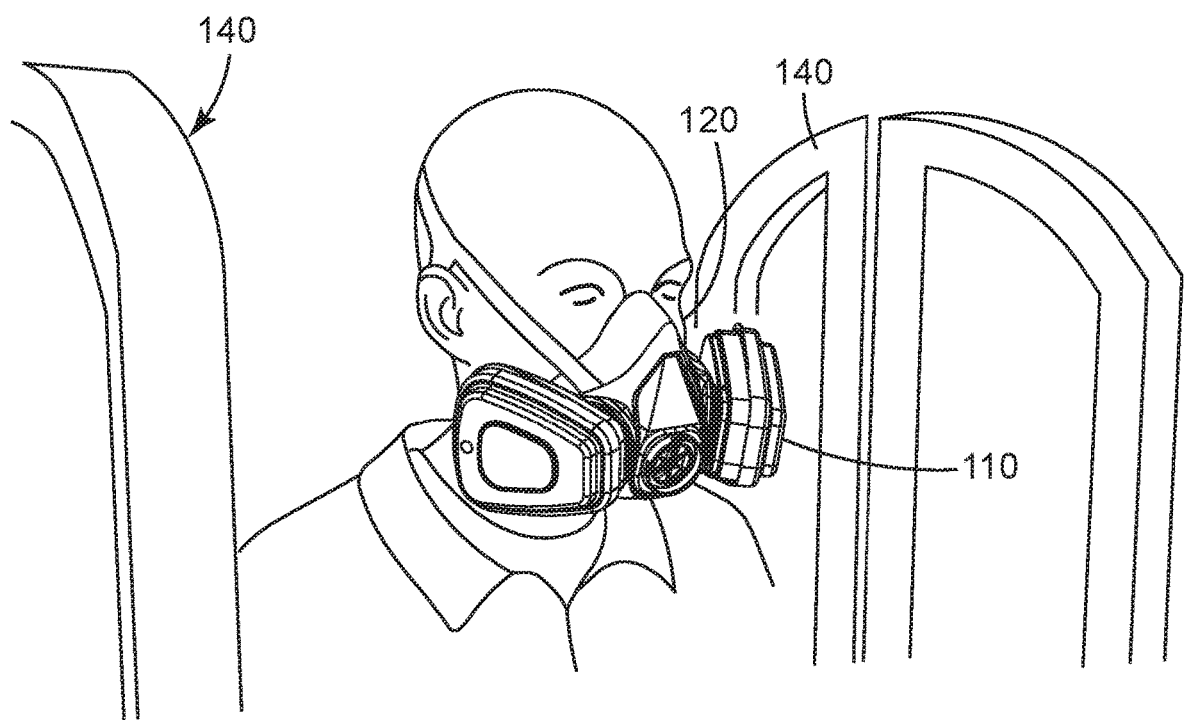
FIG. 4 is a schematic view of a wearer passing an exemplary data acquisition portal which may be used in some exemplary embodiments utilized in the system of FIG. 1 and wearing a smart tagged RPE article.

Reference is made to FIG. 3 for illustrating a combination sensing and smart device 300 that may be attached directly to an article of PPE (not shown). The sensing and smart device 300 includes a combination of a sensing device 304, such as photo-ionization detector (PID), and a smart tag 302, such as an RTLS tag. The functionalities of the sensing device and the smart tag remain the same despite being physically coupled together. The combination sensing device 300 may also provide location information that may be mapped to identify a location(s) in which the concentration levels may change (e.g., spike). The smart tag 130 may provide location information that may be used to determine if a configuration is approved in one or more locations.

The network 160 may include, without limitation, a local-area network (LAN), wide area network (WAN), the internet, or a wireless network, such as a wireless local area network (WLAN). The programmable electronic system 150 may represent any type of data processing system, computer system, programmable logic devices, or the like for processing the data. The computer system 150 may include server computers, client computers, PC-based servers, minicomputers, midrange computers, mainframe computers; or other suitable devices. In some exemplary embodiments, the computer system 150 may include portable computer systems including laptops, handheld computer systems. In addition, the system 100 may include one or more local computer systems 170 located in the work environment 125. As such, workers may be able to obtain pertinent data, for example, a real-time assessment of the condition of the work environment as it pertains to their PP configuration while in the work environment 125. The local computer system 170 typically includes portable computer systems including laptops, handheld computer systems. The local computer system 170 may also include other computer systems, such as, client computers, PC-based servers, minicomputers, midrange computers, mainframe computers; or other suitable devices.

Figure 2:
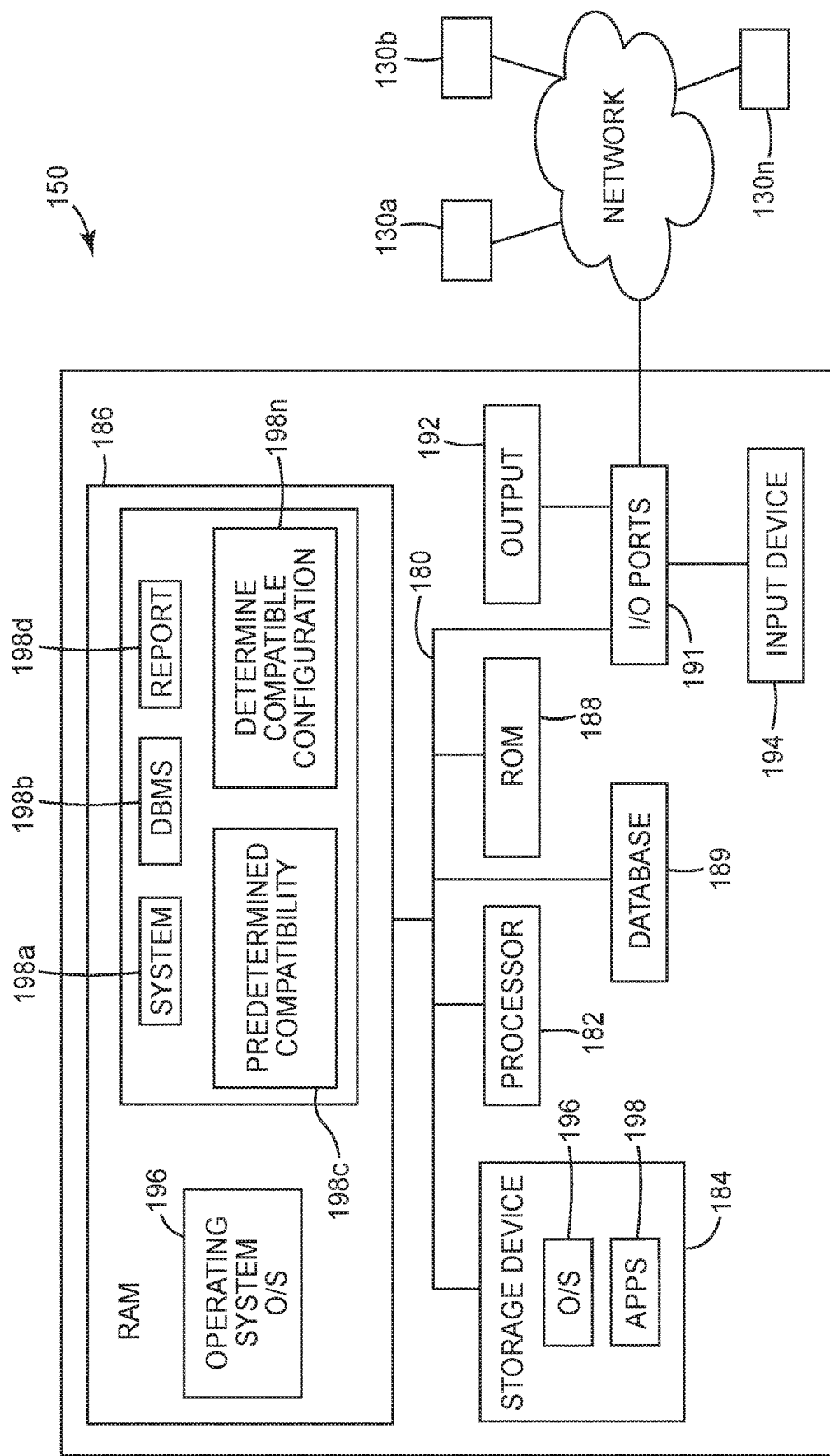
FIG. 2 is a block diagram of a computer system utilizable in an information retrieval system of the present disclosure.

With continued reference to FIG. 2, there is depicted a server computer system 150. It is depicted as comprising at least one system interconnect bus 180 to which various components are coupled and communicate with each other. Coupled to the system interconnect bus 180 is at least a single data processor unit 182, storage device 184, memory such as random access memory (RAM) 186, read only memory (ROM) 188, a relational database management system (DBMS) 189, and input/output (I/O) ports 191. The relational database is a computer database management system 189 controlling the storing, updating, and retrieving of data to database files for use in tracking combinations of component(s) and PP configurations against the predetermined condition(s) or criteria under the control of the applications to be described hereinafter. The database files contain all relevant information pertaining to the operational parameters of the readers. Furthermore, one or more output devices 192 such as a display, as well as one or more user interface input devices 194, such as a keyboard and/or pointing device is respectively coupled to the I/O ports 191. In known fashion, the output and input devices 192 and 194; respectively permit wearer interaction with the computer system 150. The I/O port 191 typically includes various controllers (not shown) for each input device 194, such as a keyboard, mouse, joystick, and the like, as well as the output device 192, such as an Ethernet network adapter, infrared device and display (not shown). The processor 182 controls the input device 194 which provides a user interface for allowing a wearer to access information, such as appropriateness of their combination of component(s) and PP configurations being worn.

The processor unit 182 may be any suitable processor and sends and receives instructions and data to and from each of the computer system's components that are coupled to the system interconnect bus 180 to perform system operations based upon the requirements of the computer system's operating system (OS) 196, and other specialized application programs 198*a*-198*n* (collectively 198).

The ROM 188 typically controls basic hardware operations. The storage device 184 may be a permanent storage medium, such as a hard disk, CD-ROM, tape, or the like, which stores the operating system 196 and the specialized applications programs 198. The RAM 186 is volatile memory. The contents of the RAM 186 may be retrieved from the storage device 184 as required. Illustratively, the RAM 186 is shown with the operating system 196 and application programs 198 concurrently stored therein. The program code of the operating system 196 and/or application programs 198 is sent to the RAM 186 for temporary storage and subsequent execution by the processor 182. Additionally, the RAM 186 is capable of storing files from the operating system 196, as well as files from one or more application programs.

An information retrieval system application program(s) 198*a* is one typically utilized for controlling operations of the information retrieval system 102 including the functionalities described herein with respect to the smart tags, data acquiring devices 140, and sensors 145. Provision is made for a suitable database management system application 198*b* to run the database 189 in a manner consistent with the present disclosure. Also, provision is made for a predetermined configurations compatibility application 198*c*. This may, in some cases, include a table or algorithm correlating the components and PP configurations to approved PP configurations based on, for example, the noted government approved guidelines. Against these tables or algorithms, determinations are made as to whether configurations of the components and PP configurations satisfy the predetermined criterion relating to approved PP configurations. Also, the configuration compatibility application may determine if an approved PP configuration is approved for a particular worker that is about to use it, as well as other PP articles. The configuration compatibility application 198c is updatable based on newer issued rules and regulations or changed circumstances, such as additional risks in the work environment. Updated versions of applications may be acquired from any source and by any suitable means including through the internet or downloadable from the network. Data from the tagged components and articles, as well as input information from the user through a suitable input data interface regarding risks in the work environment, assists in determining which predetermined criteria are to be used.

A report generating application 198d is provided that may generate reports containing a variety of data in different reporting formats tailored for purposes including those described below responsive to its operation or responsive to requests by users of the system. These reports may be generated to allow, for example, workers, supervisors, health professionals access to a wide variety of information including the history and status of components and articles; medical information of workers, information relating to fit-testing of workers, as well as a worker's training, job responsibilities, seniority or experience, access privileges. All other suitable information may be reported on including any other information relating to servicing, maintenance, change-out, as well as other information regarding of component(s) and PP configurations.

The PP configuration compatibility determining application 198n determines whether at least a first component and at least a second component are compatible so as to be assembled in an approved PP configuration. The PP configuration compatibility determining application 198n of the present disclosure enables determining the compatibility of combinations of tagged component(s) of a configuration against at least a predetermined criterion relating to the approved configuration of components for a particular type of PPE article, such as provided by the application 198(c). Such determinations may follow retrieval of smart tag data information logged into the database after such data was acquired from the smart tags. The determination may be responsive to processing the noted acquired data against the predetermined criterion, such as expressed in the exemplary compatibility chart. The present exemplary embodiment also contemplates support for determinations regarding whether the approved PP configuration is compatible with other PP configurations, worker(s) or location(s).

Figure 6:
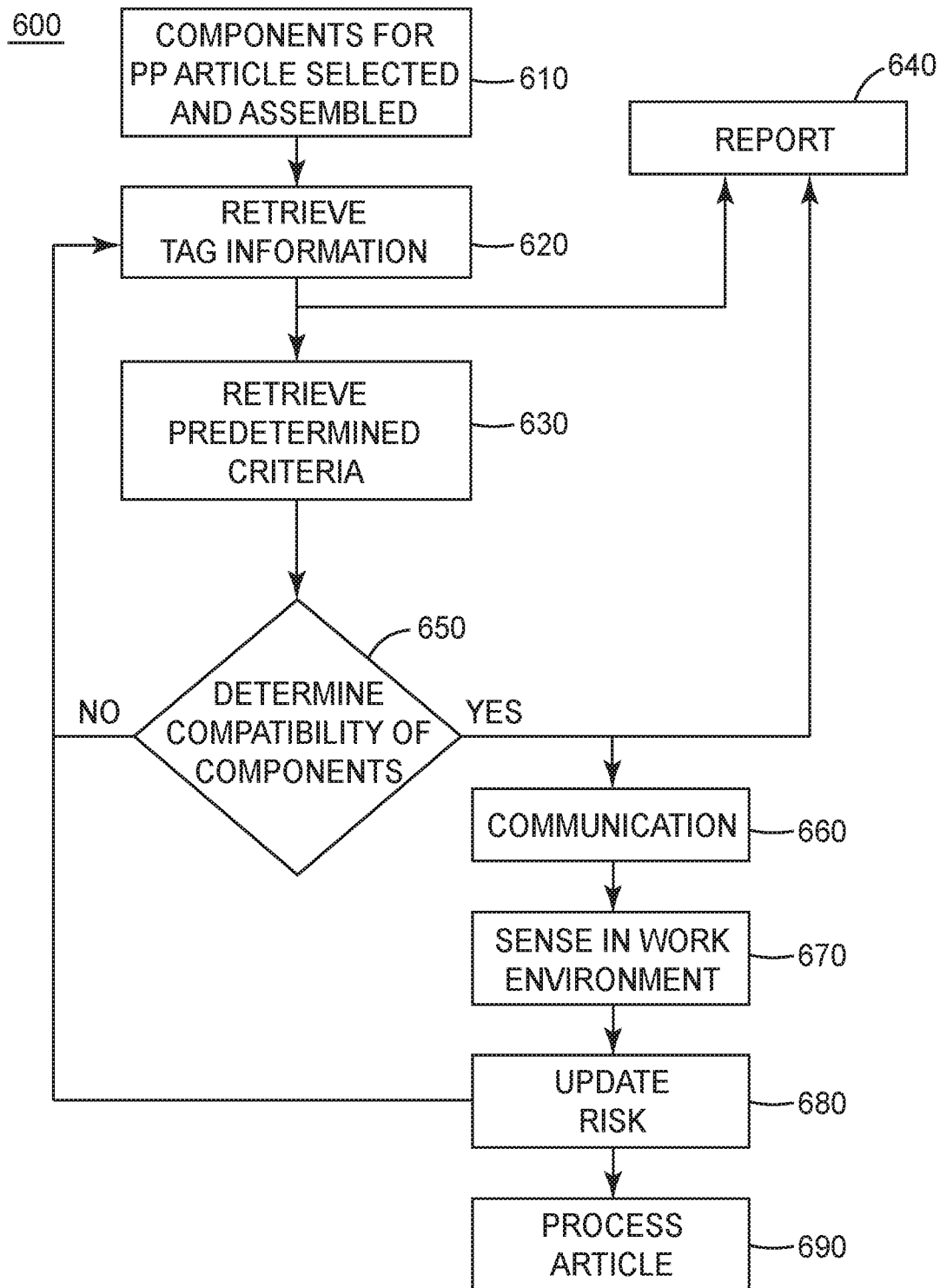
FIG. 6 is a flow diagram of one exemplary embodiment of a process that may be performed according to the present disclosure.

FIG. 6 illustrates an exemplary embodiment in which the compatibility determining process 600 may be performed by the PP configuration compatibility determining system 100. The compatibility determining process 600 may commence in a Components For PP Article Selected And Assembled block 610. Essentially, one or more components for use in assembling the PP configuration, i.e., a configuration of components adapted to be used in the work environment may be gathered from any suitable source, such as from equipment storage areas (not shown). Selection of all the components to be used in combination for an approved PP configuration may be made through any known procedure, typically by the worker or a health supervisor following known procedures or the like. In one exemplary embodiment, the worker may select the components based on the type of hazard of the workplace that the worker will be exposed. Additionally or alternatively, a worker may input the type of PPE article for which a particular configuration of components needs to be evaluated to determine whether it is an approved PP configuration. In one exemplary embodiment, a library system application may be modified to check for a configuration of components by checking to see if sets of components to belong to a particular configuration. In another exemplary embodiment, as will be described, if a person is not compatible with an approved PP configuration, then a determination may be made that the person is not compatible to the approved PP configuration. Because there are different models for each of the PP configurations and components (e.g. filter cartridge, battery, breathing tube, hose, etc.) possibilities exist for them not being compatible with each other. As noted, probabilities exist that the selected and assembled configuration may not satisfy the predetermined criterion even though seemingly appropriate components were selected and assembled. However, according to the present disclosure such possibilities are substantially reduced or eliminated.

The compatibility determining process 600 may proceed to a Retrieve Tag Information block 620, whereat a worker may input information, regarding the PPE article and the associated components into the database as well as his/her own identification, such as through a badge. As noted, there is no limit on the information that may be provided by the smart tags or the worker. The smart tag data may be acquired by any one or more of the data acquiring devices 140. The data acquiring devices 140 may be at fixed locations, such as prior to entering the work environment 125, or by portable devices at any location. Optionally, in order to identify the wearer, the latter may present his/her badge to an appropriate data acquiring device 140. One or more smart tags or badge may also include other data regarding the wearer, such as medical, fit test, job description, seniority, training, and other qualifications. As such, a determination may be made as to whether or not the worker has been approved as compatible, i.e., approved to use a certain PP configuration. The retrieved data is forwarded to the database of the computer system, and, if operational, the local computer system. In some embodiments, the data may include the identification of an article, date, and or timestamp, as well as the location of the data acquiring device. The present disclosure envisions that the retrieve tag information may occur more than once and at any suitable number of points in the determining process.

The compatibility determining process 600 may proceed to Retrieve Criteria block 630, whereat the established a predetermined criteria application 198c retrieves at least one appropriate predetermined criterion (or criteria) from the database for the appropriate PP configurations and their respective associated components and configurations of components. The retrieval may be based on any one or more of retrieved tag information, information inputted by the worker though a data input device as to the hazard(s) that he/she will be exposed to or a workplace sensor reading. The retrieval may be based on selections according to the component being tracked or inputted information. As noted, the predetermined criterion may be obtained from many different sources that provide guidance on the proper configuring of the combinations of PP configurations and components. In one exemplary embodiment, the component/configuration compatibility chart 800 may be selected. In other exemplary embodiments, other predetermined criteria may be used, such as other charts, tables, algorithms or the like having correlations of, for example, serial and model numbers existing between approved combinations of PP configurations and components. Each of the RPE article and the components that are selected and assembled at the block 610 will be assessed against the predetermined criterion.

In this exemplary embodiment, model BE-12 headgear component listed in column 804*a* has an approval number TC 23-1181 (col. 822*a*) indicating that it provides for protection with organic vapors listed in column 824 with the cautions and limitations listed in column 826. The model BE-12 headgear component may be used with any of the breathing tubes listed in columns 806*a-b*, the blower component 808, only the filter cartridges/canister component model 456-00-01 listed in column 810*a*; the power source components 812*b-d*, but not model 520-0115 R1—812*a*; and any of the belt models listed in columns 814*a-c*; airflow indicator 816; and any of the accessory models listed in columns 818*a-d*. If model BE-12 is used with a filter cartridge/canister component other than the model listed in column 810*a*, then such a component would not be approved and a resulting configuration would not be approved. On the other hand, if a workplace had ammonia and methylamine, then the model BE-12 must have a TC23-1187 approval number. With such an approval number this model could be used with all the same components, as in the previous example, but only the approved filter cartridge/canister component in column 810*b*. All other filter cartridge/canister components would not be approved as well as any configuration including them.

The compatibility determining process 600 may further include a Report block 640 that follows the Retrieve Criteria block 630 under the control of the reporting application 198*b*. The Report block 640 is operable for generating one or more reports relevant to a wide variety of subjects including, but not limited to, the selected and assembled article and components, the workers, acquired and sensed data, the work environment, and other pertinent information, as well as histories thereof. Typically, the Report block 640 may generate a report in a format acceptable by an entity requesting the report, for example, the business entity using the system 100, or a governmental agency, such as OSHA, responsive to requests. These reports may be generated to allow, for example, workers, supervisors, health professionals access to a wide variety of information including the history and status of components and articles; medical information of workers, information relating to fit-testing of workers, as well as a worker's training, job responsibilities, seniority or experience, access privileges. All other suitable information may be reported on including any other information relating to servicing, maintenance, change-out, as well as other information regarding of component(s) and PP configurations.

While the Report block 640 follows Retrieve Criteria block 630, it will be appreciated that reports may be generated at any one or more points in the process. The reports may be generated by requests of the workers or other persons of interest or even responsive to requests by the government. The reports generated may be transmitted across the internet as well. There is no time limit to generating the reports.

The compatibility determining process 600 then may proceed to a Determine Compatibility of Configuration block 650. The Determine Compatibility of Configuration block 650 may be under the control of the compatibility determining application. As such, the data acquired from the components, such as model numbers, is compared to the predetermined criterion. In this exemplary embodiment, the data is compared to the component/configuration compatibility chart 800 to determine if the components are approved based on the configuration of the chart. In other exemplary embodiment, other pertinent information, such as information regarding the components, the article of PPE, the user or the work environment will be processed to determine if such combination satisfies a predetermined criterion, which as noted was retrieved in the Retrieve Predetermined Criterion block 630. The compatibility determining application acts to store the determinations made in the Determine Compatibility of Configuration block 650 as well as communicate such information in order to notify appropriate persons, a computer system, or the like as to the determinations made. If the actual combination, when compared to the predetermined criterion, fails to find an approved PP configuration then a negative determination (i.e. No) is made. This may occur when a component to be used is compared against the chart 800, as by serial number and/or a model number, to determine if the one component to be used is correlated to the serial number or model number of one or more approved components. If the decision is negative, the decision may be communicated and the process 600 returns to the Select and Assemble Components block 610, whereat a new component(s) may be selected and assembled and the process repeated. Alternatively, if all the noted components are compatible with each other and/or the article of PPE, then a positive determination (i.e., Yes) is made. The positive determination means that the tagged combination or configuration includes components that are have been matched as by for example, serial number, model number or some other data as being compatible. As noted, these determinations are stored in suitable memory for subsequent processing. The compatibility determining application also may take into account who the worker is, or the location of the combination of approved components, in order to determine if the combination may operate with such a worker, or in such a location.

The compatibility determining process 600 may include a Communicate block 660, whereat compatibility or non-compatibility is communicated, using any known communication methodology, to appropriate persons, or reporting entities. Such a communication may be transmitted to the user, the database, the user's supervisor, industrial hygienist or other appropriate personnel. The process of this block may be occurring at other times. In one exemplary embodiment, such communications may be made as a message to display screen of the computer or to a personal digital assistant (PDA), pager, cell phone, mobile computing device or the like. It will be appreciated other suitable software applications may be used to provide such communication. Also in other exemplary embodiments, such communications may include an alarm, message or audible signal to appropriate persons including the user and/or supervisor. The compatibility determining process 600 may communicate and identify one or more missing components 110 for the proper system compatibility.

The compatibility determining process 600 may optionally proceed to the Sense In Work Environment block 670 to determine if conditions of the work environment change such that a new or different configuration is required to be worn by the worker. In the Sense In Work Environment block 670, one or more sensors, like the PID sensor 145, is operable for providing current or real-time sensed data regarding current concentration levels of contaminant vapors (e.g., benzene) in the work environment 125. This sensor data is forwarded to the database. The compatibility determining process 600 may proceed to the Update Risk block 680. In the Update Risk block 680, the data from the sensor 145, stored in the database, under control of the determining application 198*n*, is acted upon by the predetermined configuration compatibility application 198c. If an update is necessary because the original configuration of components no longer provides an approved PP configuration, such as when a new, different or additional article of PPE or its component is required because of a sensed additional hazardous material being sensed in the Sense In Work Environment block 670, the process may proceed back to the Components For PP Article Selected and Assembled block 610. At the block 610, a new combination of components may be selected and assembled. Also, based on the sensed data a different predetermined criterion (e.g. a different set of compatible components) may be selected as the predetermined criterion governing compatibility. As such, this enhances the overall advantages provided by the present disclosure. Optionally, the process 600 may proceed to a Process Article block 690, for example, if the article or any of its components need to be processed based on a result of the determination. The present disclosure envisions that a wide variety of processes may be performed to handle the components and PP configurations forming the PP article, such as disposal, cleaning, refurbishing, or the like. A wide variety of processing includes, but is not limited to, servicing, maintaining, or decontaminating the articles.

Figure 7:
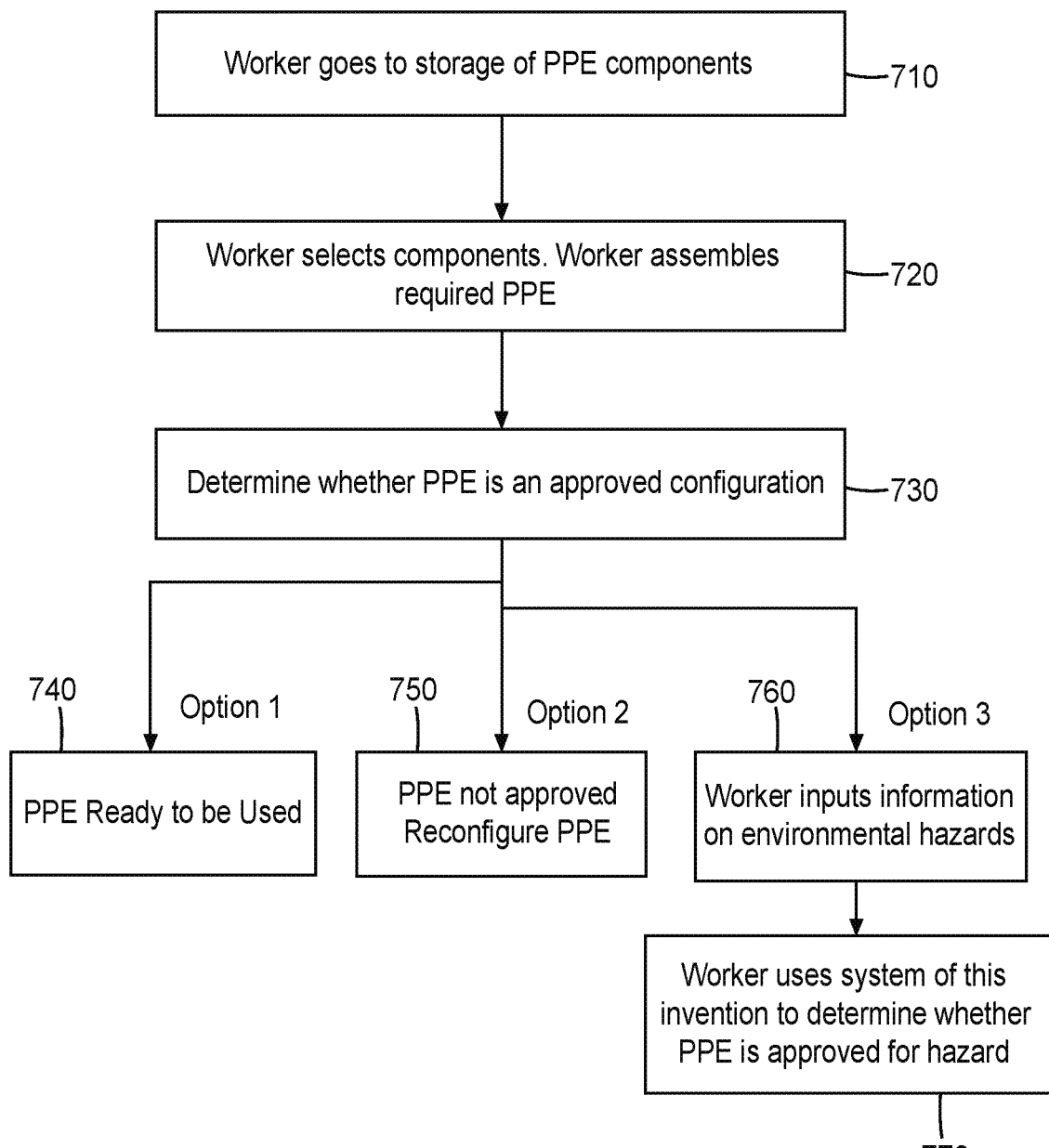
FIG. 7 is a flow diagram of another exemplary embodiment of a process that may be performed according to the present disclosure.

FIG. 7 illustrates an exemplary embodiment in which the compatibility determining process 700 may be performed by the PP configuration compatibility determining system 100. In this exemplary embodiment, in a Worker goes to storage of PPE components block 710, a maintenance personnel/worker is ready to assemble or configure at least a first and second component that may be used in formation of a PPE article. In Worker selects components/Worker assembles required PPE block 720, the worker assembles the components thought to be appropriate for an approved configuration. This may be done at any point of assembly of the components, such as the location where the components are stored. Assembly into a PPE configuration may be done by any known methodology. The compatibility determining process 700 then proceeds to Determine whether PPE is an approved configuration block 730. This block 730 is a combination of the process blocks 630, 640 and 650 noted above in FIG. 6. As such, the description of the process in these blocks is incorporated herein. As such, if the determination is affirmative that the PPE is an approved configuration, then PPE Ready to be Used block 740 follows, whereat the user may proceed to the work environment. If determination in block 730 is negative that the PPE is not approved, then a worker/maintenance personnel reconfigures the PPE in block 750. In Worker inputs information on environmental hazards block 760, a sensor may be used to input information on the environment in which an approved PPE configuration is used. The worker may also input other information that pertains to the approved configuration and whether the latter is suitable for a work environment. Such other information may relate to location(s), worker, and other PP configurations. A variety of known and suitable approaches, such as a computer system or PDA can be used to communicate such information.

EXAMPLES

The following examples are prophetic examples using the principles of the present disclosure.

Example 1—Right Battery for Powered Air Purifying Respirator

Maintenance personnel or worker can request, secure, or buy different battery components for different respirator systems. Currently, a person (maintenance PPE personnel, industrial hygienist, worker, product developer, battery management person) checks and determines that the battery component is suitable or approved for organic vapors with particulate (HEPA) protection.

The PP configuration of this example may be a 3M Breathe Easy™ Belt-Mounted Powered Air Purifying Respirator (PAPR's) that is commercially available from 3M Company, St. Paul, Minn. for protection against gases, vapor and/or particles. An approved PP configuration may comprise: headgear, cartridge, breathing tube, blower, batteries (e.g., NiCd or lithium), flow meter, battery chargers, waist belts, and filter/cartridges/canisters. Each of these components may have attached to it (by adhesive, mechanical fastener, clips, etc.) a smart tag containing identification of the component. It can also contain information on service life or shelf life.

In this example, a worker or maintenance personnel is preparing a RPE for an environment where organic vapor (OV) and particulate (HE) protection is required. The noted environment of this example may require use of components having a NIOSH TC 23C-1184 approval number (see, FIG. 8). In this example, a comparison may be made to a compatibility chart 800, for the approved PP configuration and components. The worker or maintenance personnel uses the compatibility determining process 600 to assess the RPE. For a respiratory system to be approved, the battery component must have a NIOSH TC 23C-1184 approval number. The worker assembles an RPE assembly whose tagged components are headgear BE-12, breathing tube 520-01-80R01, blower 022-00-03, canister 456-00-01, the power source BP-15, the belt 520-02-23 and the airflow indicator 520-01-21, and proceeds to use the compatibility determining process 600 to assess RPE compatibility. The compatibility determining process 600 issues a "yes" or "approved assembly" communication. As noted in FIG. 8, battery BP-15 has the NIOSH approval number. Then, the worker assembles another RPE whose tagged components are headgear BE-12, breathing tube 520-01-80R01, blower 022-00-03, canister 456-00-01, the power source BP-17IS, the belt 520-02-23 and the airflow indicator 520-01-21. For this RPE, the compatibility determining process 600 issues a "no" or "non-approved assembly" communication. Hence, battery component BP-17IS is not a NIOSH approved for use in a respirator system in the noted environment.

The process 600 of the present disclosure may be utilized to scan each smart tag of each component and make a determination of whether the components form an approved PP configuration. The system may then notify the appropriate personnel of the determination, for example, by displaying a message on a screen of a computer as noted above.

Example 2—Right Breathing Tube for Respiratory Protection System

This example determines whether a breathing tube in the configured PPE combination is an approved breathing tube. The tube may be (e.g., tube 15-0099-10) only approved with an Adflo™ blower that is commercially available from 3M Company, St. Paul, Minn. Maintenance personnel could wrongly select another blower and configure the system improperly. The mistake can only be detected by a knowledgeable person. The present disclosure may acquire data from smart tags attached to breathing tubes and Adflow™ blower and determine whether the breathing tube is the proper one for that particular blower. In this example, reference would be made to a component/configuration compatibility chart that may be similar to chart 800. If both the breathing tube and blower are approved components as indicated by the chart, such will be determined by comparing, for example, their model numbers to the appropriate chart for the particular configuration being evaluated. Appropriate personnel may be notified of the determination, for example, by displaying a message on a screen of a computer. Accordingly, maintenance personnel will be able to make a quick and accurate determination of the assembled configuration is approved or meets the predetermined criterion.

Example 3—Right Cartridge for Given Hazardous Environment

Maintenance personnel or worker can request, secure, or buy different cartridges for the purifying respirators. In this example, maintenance personnel input the type of hazard environment that the worker will be exposed. The retrieve predetermined criteria application provides predetermined criteria that indicates which cartridges are approved for a respiratory system in the noted environment. If the input information indicates that organic vapors and particulate hazards (OV) exist in the work environment, then all components should have a NIOSH TC 23C-1184 approval number. From FIG. 8, the only cartridges having model number 450-00-01 are approved. Accordingly, other cartridges with different model numbers will not be approved. The results of such determinations may be logged into the database and communicated to the worker or the like as noted above.

It will be appreciated that numerous and varied other arrangements may be readily devised in accordance with these principles by those skilled in the art without departing from the spirit and scope of the invention as claimed.

Although the methods and system of the present disclosure have been described with referent to specific exemplary embodiments, those of ordinary skill in the art will readily appreciate that changes and modifications may be made thereto without departing from the spirit and scope of the present invention.

What is claimed is:

1. A system comprising:
   a component configured for use with an article of PPE, the component configured with a smart tag that stores first data;
   an article of PPE configured for use with the component; and
   a computing device configured to:
      select the first data from the smart tag that corresponds to the component configured for use with the article of PPE and select second data that corresponds to the article of PPE;
      determine, using the first data from the smart tag and the second data that corresponds to the article of PPE, whether the component configured for use with the article of PPE is compatible with the article of PPE as an approved combination, wherein compatibility is based at least in part on a determination whether a predetermined criterion is satisfied that defines, for a work environment that has at least one condition, the approved combination to be used together, wherein the approved combination is defined by at least one identifier or type of the component as being compatible with the article of PPE for the work environment; and
      perform at least one operation that is based at least in part on whether the component configured for use with the article of PPE is compatible with the article of PPE as the approved combination.

2. The system of claim 1, wherein to perform the at least one operation that is based at least in part on whether the component configured for use with the article of PPE is compatible with the article of PPE as an approved combination, the computing device is configured to perform an operation comprising: communicate information that is based at least in part on whether the component configured for use with the article of PPE is compatible with the article of PPE as the approved combination.

3. The system of claim 2, wherein to perform the at least one operation that is based at least in part on whether the component configured for use with the article of PPE is compatible with the article of PPE as an approved combination, the computing device is configured to output for display a message that is based at least in part on whether the component configured for use with the article of PPE is compatible with the article of PPE as the approved combination.

4. The system of claim 1, wherein the article of PPE is a respiratory protection system, and wherein the component comprises at least one of: headgear, cartridge, breathing tube, blower, battery, flow meter, battery charge, waist belt, filter, and canister.

5. The system of claim 1, wherein one or more of the first and second data include at least model or serial number information of the corresponding component or article of PPE.

6. The system of claim 1, further including:
   a third article of PPE with a smart tag storing third data, wherein the computing device is further configured to acquire the third data, and wherein the computing device is further configured to process the acquired third data against the predetermined criterion and to determine whether the third article of PPE is compatible with the combination of the component and the article of PPE.

7. The system of claim 1, wherein one or more of the first and second data correspond to a worker.

8. The system of claim 1, wherein one or more of the first and second data correspond to a location.

9. A computing device comprising:
   one or more computer processors; and
   a memory comprising instructions that when executed by the one or more computer processors cause the one or more computer processors to:
      select first data from a smart tag configured with a component for use with an article of PPE and select second data that corresponds to the article of PPE;
      determine, using the first data from the smart tag and the second data that corresponds to the article of PPE, whether the component configured for use with the article of PPE is compatible with the article of PPE as an approved combination, wherein compatibility is based at least in part on a determination whether a predetermined criterion is satisfied that defines, for a work environment that has at least one condition, the approved combination to be used together, wherein the approved combination is defined by at least one identifier or type of the component as being compatible with the article of PPE for the work environment; and
      perform at least one operation that is based at least in part on whether the component configured for use with the article of PPE is compatible with the article of PPE as the approved combination.

10. The computing device of claim 9, wherein to perform the at least one operation that is based at least in part on whether the component configured for use with the article of PPE is compatible with the article of PPE as an approved combination, the computing device is configured to perform an operation comprising: communicate information that is based at least in part on whether the component configured for use with the article of PPE is compatible with the article of PPE as the approved combination.

11. The system of claim 9, wherein to perform the at least one operation that is based at least in part on whether the component configured for use with the article of PPE is compatible with the article of PPE as an approved combination, the computing device is configured to output for display a message that is based at least in part on whether the component configured for use with the article of PPE is compatible with the article of PPE as the approved combination.

12. The computing device of claim 9, wherein the article of PPE is a respiratory protection system, and wherein the component comprises at least one of: headgear, cartridge, breathing tube, blower, battery, flow meter, battery charge, waist belt, filter, and canister.

13. The computing device of claim 9, wherein one or more of the first and second data include at least model or serial number information of the corresponding component or article of PPE.

14. The computing device of claim 9, wherein one or more of the first and second data correspond to a worker.

15. The computing device of claim 9, wherein one or more of the first and second data correspond to a location.

16. A method comprising:
  selecting, by a computing device, first data from a smart tag configured with a component for use with an article of PPE and select second data that corresponds to the article of PPE;
  determining, by a computing device and using the first data from the smart tag and the second data that corresponds to the article of PPE, whether the component configured for use with the article of PPE is compatible with the article of PPE as an approved combination, wherein compatibility is based at least in part on a determination whether a predetermined criterion is satisfied that defines, for a work environment that has at least one condition, the approved combination to be used together, wherein the approved combination is defined by at least one identifier or type of the component as being compatible with the article of PPE for the work environment; and
  performing at least one operation that is based at least in part on whether the component configured for use with the article of PPE is compatible with the article of PPE as the approved combination.

17. The method of claim 16, wherein performing the at least one operation comprises communicating information that is based at least in part on whether the component configured for use with the article of PPE is compatible with the article of PPE as the approved combination.

18. The method of claim 16, wherein performing the at least one operation comprises outputting for display a message that is based at least in part on whether the component configured for use with the article of PPE is compatible with the article of PPE as the approved combination.

19. The method of claim 16, wherein the article of PPE is a respiratory protection system, and wherein the component comprises at least one of: headgear, cartridge, breathing tube, blower, battery, flow meter, battery charge, waist belt, filter, and canister.

20. The method of claim 16, wherein one or more of the first and second data include at least model or serial number information of the corresponding component or article of PPE.

* * * * *